(12) United States Patent
Perini (10) Patent No.: US 10,239,706 B2
(45) Date of Patent: Mar. 26, 2019

(54) DEVICE FOR CONTROLLING A FLOW OF CARDBOARD TUBULAR CORES

(71) Applicant: FUTURA S.P.A., Capannori (LU) Fraz. Guamo (IT)

(72) Inventor: Fabio Perini, Viareggio (IT)

(73) Assignee: FUTURA S.P.A., Capannori (LU) Fraz. Guamo (IT)

( * ) Notice: Subject to any disclaimer, the term of this patent is extended or adjusted under 35 U.S.C. 154(b) by 8 days.

(21) Appl. No.: 15/308,217

(22) PCT Filed: Apr. 16, 2015

(86) PCT No.: PCT/IT2015/000106
§ 371 (c)(1),
(2) Date: Nov. 1, 2016

(87) PCT Pub. No.: WO2015/170353
PCT Pub. Date: Nov. 12, 2015

(65) Prior Publication Data
US 2017/0050808 A1  Feb. 23, 2017

(30) Foreign Application Priority Data
May 5, 2014 (IT) .................. FI2014A0102

(51) Int. Cl.
*B65G 47/88* (2006.01)
*B65G 47/57* (2006.01)
(Continued)

(52) U.S. Cl.
CPC ....... *B65G 47/8884* (2013.01); *B65G 47/295* (2013.01); *B65G 47/57* (2013.01);
(Continued)

(58) Field of Classification Search
CPC ........ B65G 1/0442; B65G 1/08; B65G 1/127; B65G 47/295; B65G 47/5104–47/5127;
(Continued)

(56) References Cited

U.S. PATENT DOCUMENTS 1,749,843 A * 3/1930 Roark .................. B65G 47/295
193/40
3,358,940 A   12/1967 Beckwith, Jr. et al.
(Continued)

FOREIGN PATENT DOCUMENTS

EP        2444 363 A1     4/2012
EP        2444363 A1 *   4/2012 ............. B67B 3/064
(Continued)

*Primary Examiner* — Gene O Crawford
*Assistant Examiner* — Keith R Campbell
(74) *Attorney, Agent, or Firm* — McGlew and Tuttle, P.C.

(57) ABSTRACT

Device for controlling a flow of cardboard tubular cores (1) adapted to produce logs of paper material and intended to be stored in a collection point (2) placed downstream of the same device, including more conveyors (5; 7) each of which is adapted for carrying the said tubular cores (1) up to the entry point (6D) of a respective guide channel (6) having an entry point (6D) and an exit point (6F), interception devices (8) adapted for intercepting the tubular cores (1), the interception devices being arranged and acting on each of the channels (6) to adjust the flow of the tubular cores through the respective exit points (6F), and programmable device (UE) adapted for activating and deactivating the interception device (8). The interception devices (8) are adapted to selectively form two nips (N1, N2) inside the guide channel (6), the nips (N1, N2) being selectively formed at a predetermined distance from each other.

20 Claims, 5 Drawing Sheets

(51) Int. Cl.
*B65G 47/68* (2006.01)
*B65G 59/06* (2006.01)
*B65G 47/29* (2006.01)

(52) U.S. Cl.
CPC ......... *B65G 47/681* (2013.01); *B65G 59/062* (2013.01); *B65G 2201/0276* (2013.01)

(58) Field of Classification Search
CPC .. B65G 47/57; B65G 47/681; B65G 47/8815; B65G 47/8823; B65G 47/8869; B65G 47/8884; B65G 47/8892; B65G 59/062; B65G 2201/0276; B65G 11/203; B65H 67/06; B65H 67/068
See application file for complete search history.

(56) References Cited

U.S. PATENT DOCUMENTS

| | | | | |
|---|---|---|---|---|
| 3,905,466 A | * | 9/1975 | VanDeberg | B65G 47/57 198/449 |
| 3,999,684 A | * | 12/1976 | Ekholm | B65G 47/8815 193/40 |
| 4,004,701 A | * | 1/1977 | Moses | B65G 1/08 221/295 |
| 4,688,697 A | * | 8/1987 | Ballard | B65G 47/8815 193/40 |
| 4,830,171 A | * | 5/1989 | Kupper | B65H 67/068 198/320 |
| 4,874,080 A | * | 10/1989 | Wroblewski | B65G 15/50 198/463.6 |
| 5,259,723 A | * | 11/1993 | Willis | B65G 47/8815 198/463.6 |
| 5,456,067 A | * | 10/1995 | Marler | B65G 15/42 474/264 |
| 6,053,304 A | * | 4/2000 | Biagiotti | B65G 47/5122 198/444 |
| 2007/0224028 A1 | | 9/2007 | Lehmann | |
| 2012/0255499 A1 | * | 10/2012 | Tsubai | A01K 31/165 119/337 |

FOREIGN PATENT DOCUMENTS

JP S60 151868 U 10/1985
WO 2005/058735 A1 6/2005

* cited by examiner

DEVICE FOR CONTROLLING A FLOW OF CARDBOARD TUBULAR CORES

The present invention relates to the feeding of cardboard tubes to a storing unit, in particular of the type used in the production of logs made of paper material.

It is known that the tube forming machines used for paper converting purposes is the machine that produces the cardboard tubes (also called "cores") on which the paper is wound to form a roll or "log" which is subsequently split into multiple elements of predefined length in order to obtain rolls of toilet paper, rolls of paper kitchen etc. The tube is made from strips of cardboard, which are fed by corresponding coils, wound in a helix on a horizontal metal spindle and glued one on the other so as to form a self-supporting tubular structure. Generally, two or three strips of cardboard are used, depending on the thickness of the tubular cores to be produced. It is also possible to manufacture cardboard tubular cores from a single cardboard strip. The cardboard strips are arranged partially overlapping on each other and, by means of a eight-shaped belt wound on two guide rollers, they are rolled around the mandrel and pushed forward, until the cardboard tubular core is formed while advancing along the same spindle. Said belt wraps also around the spindle of the tube forming machine so as to engage the strips of cardboard and to produce the effect described above. Through a special cutting unit, the paperboard tubular cores are cut to a predetermined length which substantially corresponds to the length of the logs to be produced with other machines called "rewinders".

Since the production speeds of the rewinders and the tube forming machines are different, a storing unit or accumulator is placed between such machines. Currently, each accumulator is served by one tube forming machine but it is not possible to use the existing tubes supply devices to submit to the same accumulator tubes coming from more tube forming machines or coming from different lines for conveying the tubes.

The main aim of the present invention is to eliminate the above mentioned drawbacks.

This result is achieved, according to the present invention, by providing a device having the characteristics indicated in claim 1. Other features of the present invention are the object of the dependent claims.

Thanks to the present invention, it is possible to feed the same accumulator with tubes coming from more tube forming machines or coming from several lines for conveying the tubes, with a simple, economic and reliable device. Moreover, a device in accordance with the present invention allows to preserve the integrity of the tubes which, by their nature, are easily deformable even by weak forces acting on their surface.

These and other advantages and features of this invention will be best understood by anyone skilled in the art thanks to the following description and to the attached drawings, provided by way of example but not to be considered in a limiting sense, in which.

A device in accordance with the present invention can be used to introduce the cardboard tubular cores (1) produced by more tube forming machines (not visible in the drawings) or coming from more different conveying lines in an accumulator (2). The latter, according to a construction scheme known per se, has an input side (A) for the tubes, an output side (B), and more accumulation surfaces (C) between the input side (A) and the output side (B). On the input side (A) of the accumulator (2) there is mounted a vertical motorized chain (3) that is wound on an upper pulley (30) and a lower pulley (31) both with a horizontal axis, and on which are provided more teeth (32) projecting orthogonally towards the outside of the same chain and acting as supports for the tubes (1). Similarly, on the output side (B) of the accumulator (2) there is mounted a vertical motorized chain (4) that is wound on an upper pulley (40) and a lower pulley (41) both with a horizontal axis, and on which are provided more teeth (42) projecting orthogonally towards the outside of the same chain and acting act as supports for the tubes (1). The first chain (3) is used for transferring the tubes (1) from the input side (A) of the accumulator to the accumulation surfaces (C), while the second chain (4) is used to transfer the tubes (1) from the accumulation surfaces (C) to the output section (B) according to a scheme which is also known. According to the example shown in FIG. 1, the teeth (32) of the chain (3) on the input side of the accumulator (2) are sufficiently wide to be apt to receive two cardboard tubes arranged side by side. According to the example shown in FIG. 2, said teeth (32) are designed to receive one cardboard tube at a time.

Figure 1:
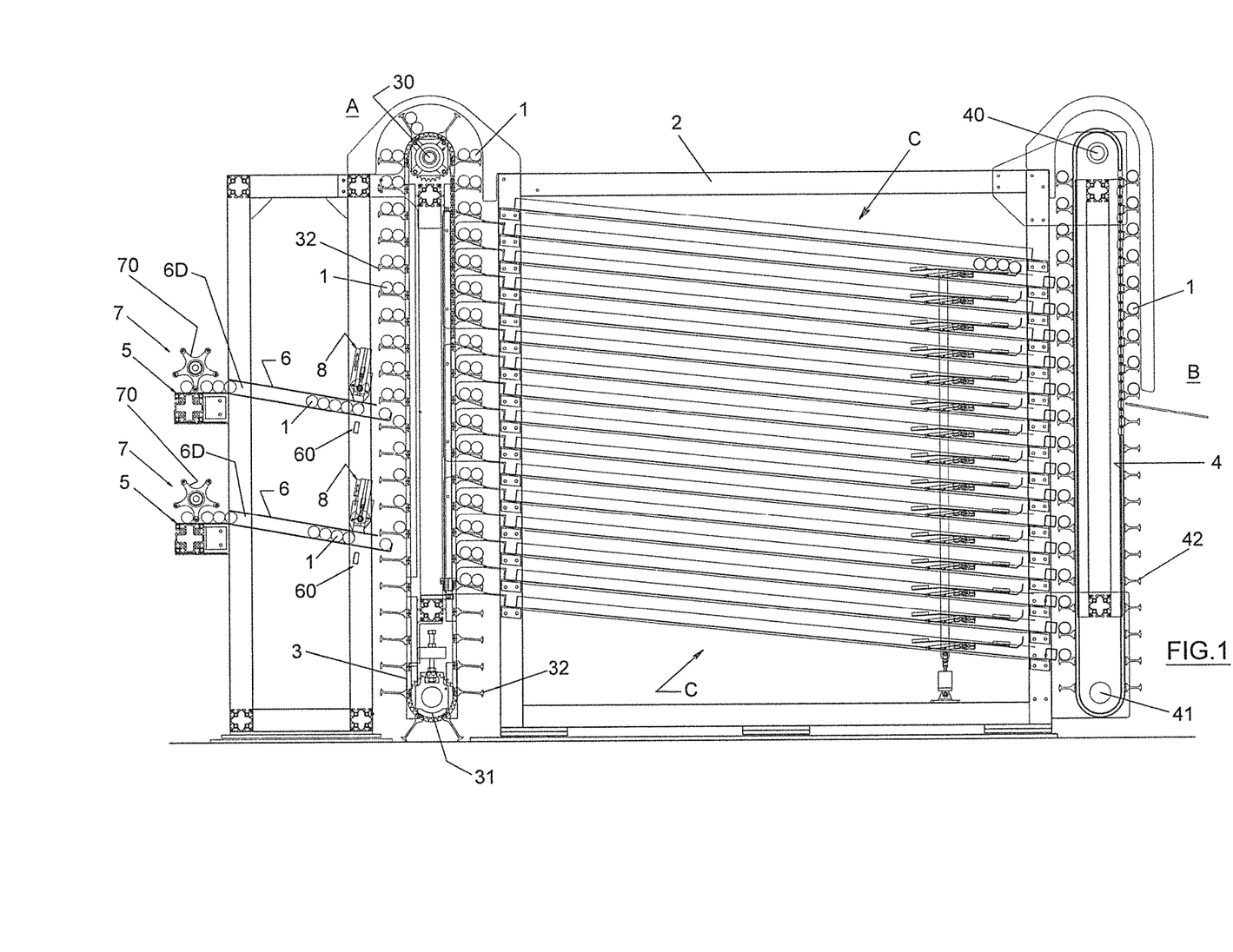
FIG. 1 is a schematic side view of an accumulator for cardboard tubes provided with a device according to the present invention.
Figure 6:
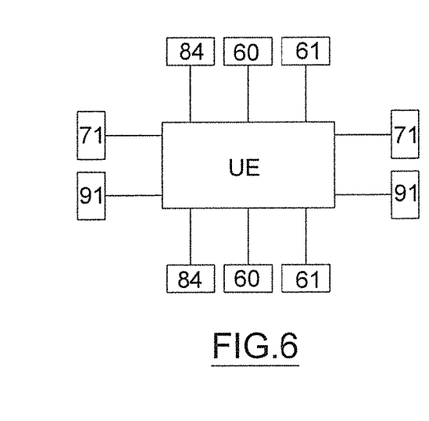
FIG. 6 is a simplified block diagram of a possible system for controlling the interception members.

Reduced to its essential structure and with reference to the accompanying drawings, a feeding device in accordance with the present invention comprises more conveying lines (5) for conveying the tubes (1) and consisting of belt conveyors on which the tubes (1) produced by more corresponding tube forming machines (not visible in the drawings) are discharged or in any other way placed on them. The conveyors (5) are at different heights and are parallel to each other, i.e. they are parallel to the longitudinal axes of the tubes (1) carried by them. In correspondence of the section input (A) of the accumulator (2) more channels (6) are provided, whose number is equal to the number of the conveyors (5), and each of which form a slide which starts from a corresponding conveyor (5). Each channel (6) has an entry point (6D) and an exit point (6F). Furthermore, on each of the conveyors (5) is arranged and acting a pusher (7) which serves to push the tubes (1) present on the conveyors (5) towards the respective channels (6). According to the example shown in the drawings, each pusher (7) is constituted by a star-shaped body with multiple radial arms (70). The body (7) is connected to an actuator (not visible in the drawings) that provokes its rotation about a horizontal axis that is parallel to the conveyors (5) when related optical control means control (71), shown only in FIG. 2 and in FIG. 6, detect the presence of a tubular core (1). With the rotation of the body (7), the tubes (1) are pushed (towards the right in the drawings) by the arms (70) and thus introduced at the entry points of the channels (6) that drive them up the input chain (3) of the accumulator (2) that, as previously mentioned, carries the tubes (1) up to the accumulation surfaces (C). In this example, the rotation of the bodies (7) is counter clockwise. In the example of FIG. 1, the channels (6) are separated, that is, they do not converge at a same point, while in the example of FIG. 2 the channels (6) converge at the same point. With reference to the example shown in FIG. 1, on each of said channels (6) is arranged and acting an interception member (8) which holds the tubes (1) in the same channels (6) and releases them under control of appropriate sensors as further described in the following.

Figure 3:
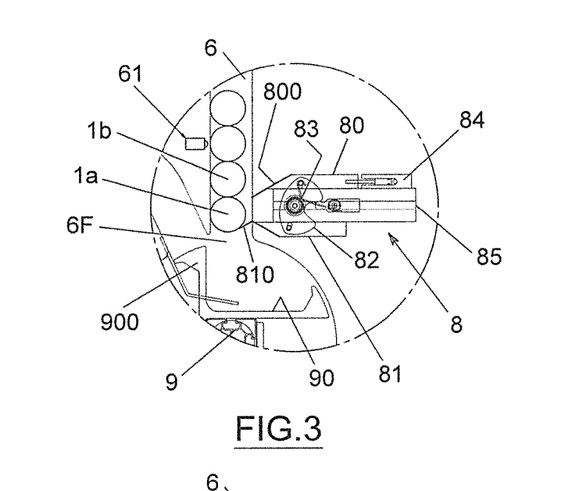
FIG. 3 is an enlarged detail of FIG. 2 wherein it is shown an interception member in a position of blocking a tubular core at the exit end of a respective guide channel.
Figure 4:
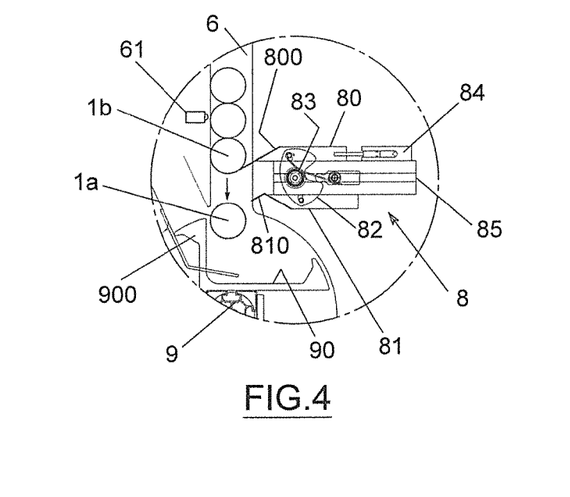
FIG. 4 shows the interception member of FIG. 3 in a position of releasing a tubular core at the exit end of a respective guide channel.

As illustrated in detail in FIG. 3 and FIG. 4, each of said members (8) for intercepting the tubes (1) comprises two gates (80,81), i.e. one upper gate (80) and one lower gate (81), connected together by a connecting rod (82) on which is invested a torsion spring (83). The upper gate (80) is connected to a linear actuator (84) which controls its movement along a guide (85) that also acts as a guide for the lower gate (81). When the actuator (84) pushes forward the upper gate (80), the lower one (81) moves back. When the actuator (84) is deactivated, thanks to the spring (83), the lower gate (81) moves forward while the upper (80) moves back. The two gates have respective inclined lips or free ends (800, 810) (they are turned towards the exit point 6F of the respective channel 6 in the example shown in the drawings).

By activating the actuator (84) the upper gate (80) advances (as illustrated in FIG. 4), while the lower one (81) moves back, so that the latter releases a tube (1) present in the terminal point of the channel (6), but the overlying tubes are prevented from falling down by the upper gate (80). And when the actuator (84) is deactivated (as shown in FIG. 3), the upper gate (80) moves back while the lower gate (81) advances, whereby the tube (1) previously intercepted by the upper gate (80) is free and is intercepted by the lower gate (81) so as to take the place of a tube previously released.

Figure 7:
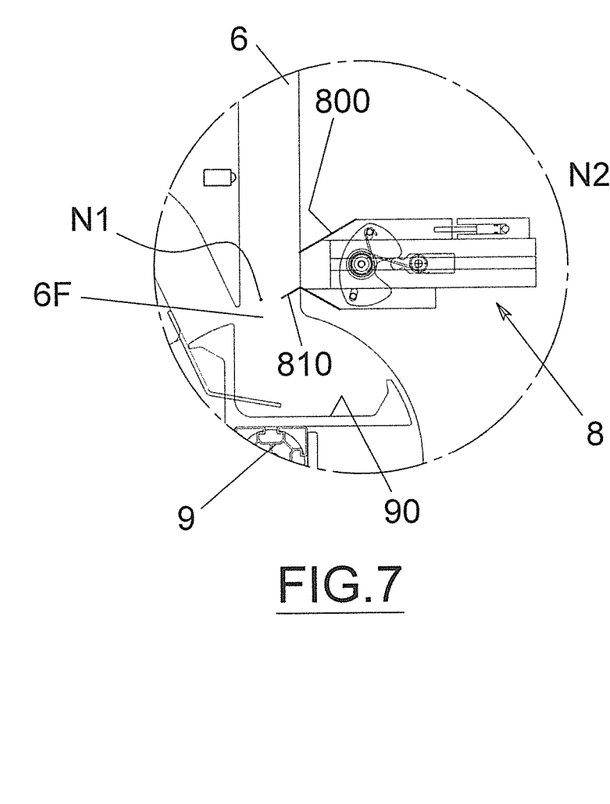
FIGS. 7 and 8 show the interception member of FIGS. 3 and 4 and the nips (N1, N2) formed inside the guide channel (6) controlled by the same interception member.
Figure 8:
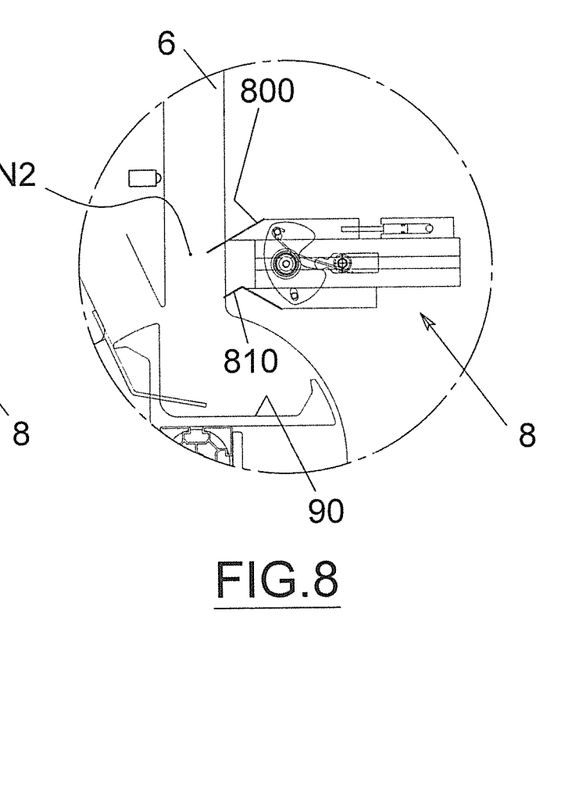

As shown in FIGS. 7 and 8, the lip (810) of the lower gate is adapted to form a nip (N1) in proximity of the exit point (6F) of the channel (6), while the lip (800) of the upper gate is adapted to form another nip (N2) at a predetermined distance above the aforementioned exit point (6F).

As shown in FIGS. 7 and 8, the nips (N1, N2) are formed by the interception member (8) selectively, in such a manner that when the lower nip (N1) is formed, the upper nip (N2) is not formed, and vice versa.

Since, as shown in detail in FIGS. 3 and 4, when the lower nip (N1) or the upper nip (N2) is formed, the tubes (1) rest on the lip (810) or on the lip (800), the integrity of the same tube (1) is preserved. In fact, the tubes are not subjected to lateral forces when they are intercepted.

With reference to the example shown in the drawings, both the lips (800, 810) are not orthogonal to the axis of the channel (6), i.e. they are inclined with respect to the axis of the channel (6). Thus, both the gates (80, 81) provide a surface on which any tube (1) can rest without impacting against the tubes (1) laterally.

The nips (N1, N2) are of such dimensions as to prevent the transit of tubes (1) when one of them is formed. According to the examples shown in the accompanying drawings, the nips (N1, N2) selectively formed by the interception members (8) are not obstructions, thus allowing a lower surface of the tubes (1) to be slightly below the lips (800, 810) when they are intercepted.

With reference to the example shown in FIG. 1, in which the channels (6) for guiding the cores (1) end at two different points, the actuator (84) is controlled by optical control means (60) arranged and acting in proximity of the exit point of each channel (6). For example, said optical control means (60) are photocells. When the optical control means (60) detect the presence of a core (1) at the exit point of a channel (6), the interception member (8) retains the cores (1); vice versa, when the control means (60) detect that the terminal point of a channel (6) is free, the interception member (8) is activated to allow the passage of a core (1) in the manner described above.

Figure 2:
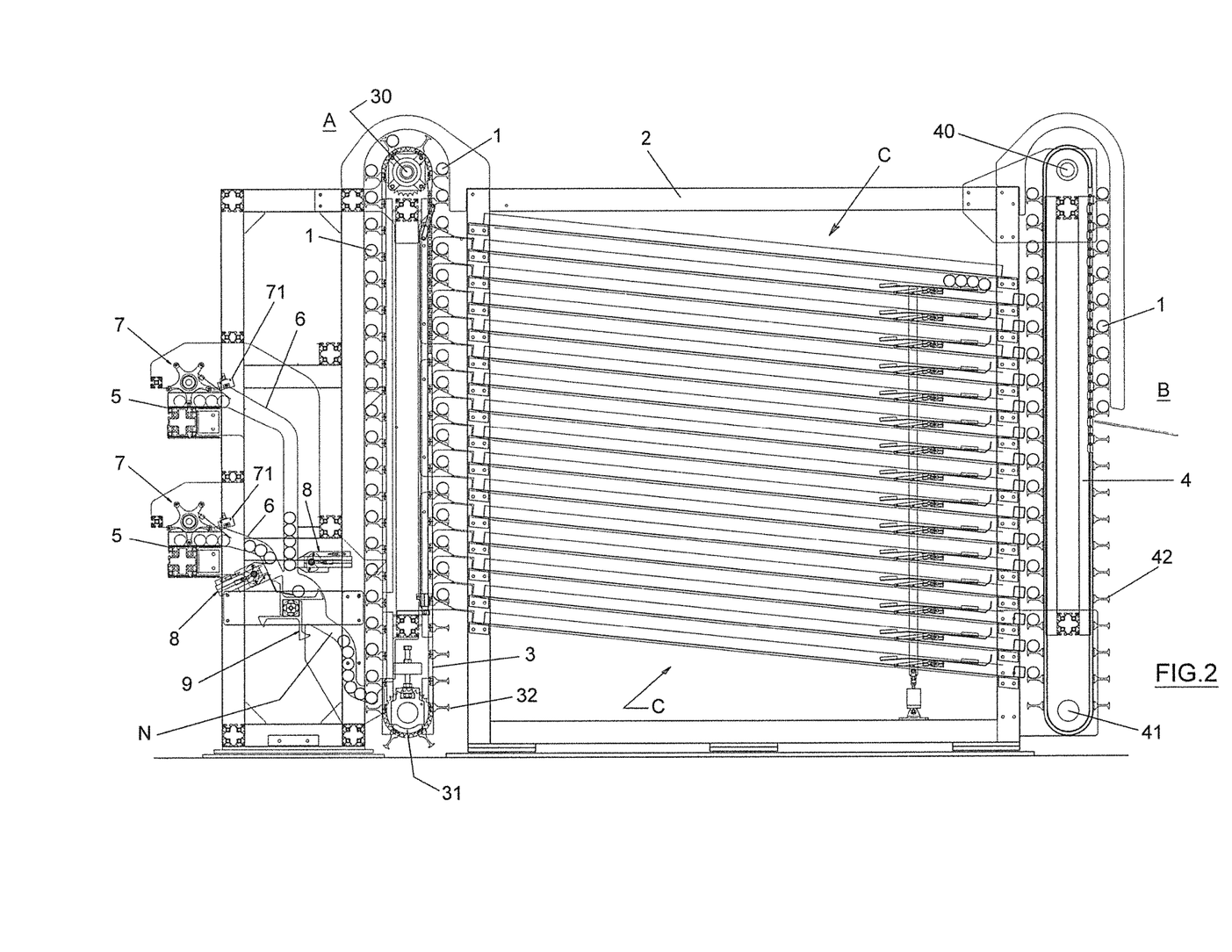
FIG. 2 is a schematic side view of an accumulator for cardboard tubes provided with a device according to a further embodiment of the present invention.

With reference to the example of FIG. 2, the channels (6) for guiding the cores (1) converge in the same point, where it is arranged and acting a rotary distributor (9) which receives the cores (1) and enters them, one at a time, in a further channel (N) provided downstream which feeds the input chain (3) of the accumulator (2). The distributor (9), known per se, is constituted by an elongated body oriented horizontally along a direction parallel to that of the conveyors (5) and placed at the point of confluence of the channels (6). The distributor (9) is provided with seats or pockets (90) intended to receive the cores (1) and to deliver the cores, after a rotation of the same distributor (9) of predetermined angular amplitude, to the chain (3). In this case, the control of the interception members (8) arranged on each of the channels (6) is managed by an optical sensor (61) arranged and acting at a predetermined distance from the terminal point of each channel (6) and by a position sensor (91) (known per se and represented only in the diagram of FIG. 6) connected to axis of the rotary distributor (9). The passage of a core (1) through the exit point of any of the channels (6) is allowed when the respective optical sensor (61) detects the presence of a core (1) and the position sensor connected to the axis of the distributor (9) detects a position of the latter suitable to receive the core. However, the distributor (9) can be omitted. In this case, the control of the interception members (8) is operated as described with reference to the example of FIG. 1. As illustrated in FIG. 3 and FIG. 4, while a core (1) is inserted in a pocket (90) of the distributor (9) along a channel (6), the other channel is closed by one of the walls (900) of the same distributor that delimit said pockets (90).

The signals emitted by said sensors (60, 61, 91) are transmitted to a programmable processing unit (UE) that process them and controls the actuators (84) on the basis of the signals thus received.

Figure 5:
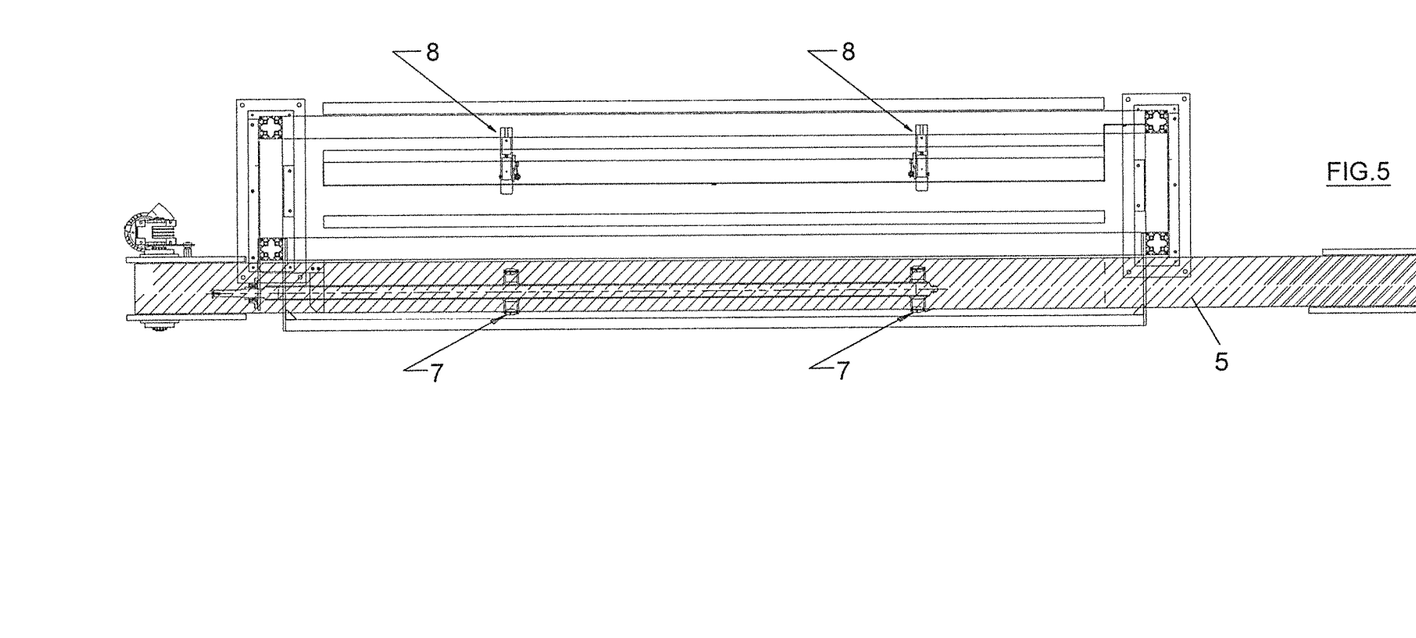
FIG. 5 is a simplified plan view of the arrangement shown in FIG. 1 wherein some parts are omitted to better illustrate other parts.

As shown in FIG. 5, each channel (6) can be provided with several interception means (8), for example two interception members (8). In this case, the control of the several interception members (8) acting in the same channel (6) is synchronized.

From the description provided above, it is evident that a device according to the present invention is a device for controlling a flow of cardboard tubular cores (1) adapted to produce logs of paper material and intended to be stored in a collection point (2) placed downstream of the same device, comprising more conveyors (5; 7) each of which is adapted for carrying said tubular cores (1) up to the entry point (6D) of a respective guide channel (6) having an entry point (6D) and an exit point (6F), interception means (8) adapted for intercepting the tubular cores (1), said interception means being arranged and acting on each of said channels (6) to adjust the flow of the tubular cores through the respective exit points (6F), and programmable means (UE) adapted for activating and deactivating said interception means (8), the interception means (8) being adapted to selectively form two nips (N1, N2) inside the guide channel (6), said nips (N1, N2) being selectively formed at a predetermined distance from each other.

In the examples described above the conveyors are formed by the set of belts (5) and the pushers (7) and the point of collection of the cores is an accumulator (2) of the type used in the production of logs of paper material.

It is understood that, in accordance with the present invention, the conveyors intended for the transport of the tubular cores (1) can be of any other type. It is also understood that the accumulator in which the cores (2) are stored may be of any type.

In practice the details of execution may vary in any equivalent way as for what concerns the individual elements described and illustrated, and with their arrangement, without departing from the scope of the adopted solution and thus remaining within the limits of the protection granted to the present patent.

The invention claimed is:

1. A device for controlling a flow of cardboard tubular cores adapted to produce logs of paper material and to be stored in a collection point placed downstream of the device, the device comprising:
   a plurality of guide channels, each of the guide channels having an entry point and an exit point;
   a conveyor means for carrying tubular cores up to the entry point of one of the guide channels;
   an interception means for intercepting the tubular cores, said interception means being arranged and acting on each of said guide channels to adjust a flow of the tubular cores through respective exit points; and
   a programmable means for activating and deactivating said interception means, the interception means being adapted to selectively form two nips inside at least one of the guide channels, said nips being selectively formed at a predetermined vertical distance from each other.

2. A device according to claim 1, wherein the conveyor means comprises conveyors, each of said conveyors comprising a conveyor belt and a pusher disposed and acting in correspondence of each of said entry points for transferring the tubular cores from the conveyor belt to said entry points.

3. A device according to claim 1, wherein said nips are formed by surfaces that are inclined with respect to the at least one of the guide channels.

4. A device according to claim 1, wherein said interception means comprises two gate valves spaced apart by a predetermined distance.

5. A device according to claim 4, wherein said gate valves are controlled by a single actuator.

6. A device according to claim 1, wherein said guide channels for guiding the tubular cores are convergent towards said collection point.

7. A device according to claim 1, wherein the exit points of said guide channels for guiding the tubular cores are spaced from each other.

8. A device according to claim 1, wherein the entry points of said guide channels are higher than respective exit points so that the tubular cores run along the guide channels by gravity.

9. A device according to claim 1, wherein said programmable means receives signals from a plurality of detectors adapted to detect a presence of the tubular cores in said guide channels.

10. A device according to claim 9, wherein said detectors are optical detectors.

11. A device according to claim 6, wherein a distributor is arranged at a point of convergence of the guide channels, the tubular cores reaching the collection point via the distributor.

12. A device according to claim 1, wherein the interception means comprises an upper member and a lower member, the upper member being located at a vertically spaced location from the lower member.

13. A device according to claim 12, wherein the interception means further comprises a connecting member, an actuator and a spring, the spring being connected to at least the lower member, the upper member and the lower member being connected to the connecting member, the upper member being connected to the actuator, the upper member moving in a direction traversing the one of the guide channels and the lower member moving a direction away from the one of the guide channels upon actuation of the actuator, the upper member moving in the direction away from the one of the guide channels and the lower member moving in the direction traversing the one of the guide channels via the spring upon deactivation of the actuator.

14. A device for controlling a flow of cardboard tubular cores adapted to produce logs of paper material and to be stored in a collection point placed downstream of the device, the device comprising:
   a plurality of guide structures, each of the guide structures having an entry portion and an exit portion, each of the guide structures defining a channel;
   a plurality of conveyors, wherein tubular cores are delivered to the plurality of guide structures via the plurality of conveyors, at least a portion of each of the conveyors being located adjacent to the entry point of one of the guide structures;
   a plurality of interception structures, each of the interception structures being associated with the channel of one of the guide structures; and
   a controller configured to operate and shut off said plurality of interception structures for intercepting the tubular cores and adjusting a flow of the tubular cores through each exit portion of the guide structures such that each of the interception structures comprises a first interception structure configuration and a second interception structure configuration, the first interception configuration defining a first nip inside the channel of one of the guide structures, the second interception configuration defining a second nip inside the channel of one of the guide structures, wherein the first nip is located at a vertically spaced location from the second nip.

15. A device according to claim 14, wherein each of the interception structures comprises an upper member and a lower member, the upper member being located at a vertically spaced location from the lower member.

16. A device according to claim 15, wherein each of the interception structures further comprises a connecting member, an actuator and a spring, the spring being connected to at least the lower member, the upper member and the lower member being connected to the connecting member, the upper member being connected to the actuator, the upper member moving in a direction traversing the channel of one of the guide structures and the lower member moving in a direction away from the channel of one of the guide structures upon actuation of the actuator, the upper member moving in the direction away from the channel of one of the guide structures and the lower member moving in the direction traversing the channel of one of the guide structures via the spring upon deactivation of the actuator.

17. A device for controlling a flow of cardboard tubular cores adapted to produce logs of paper material and to be stored in a collection point placed downstream of the device, the device comprising:

a plurality of guide structures, each of the guide structures having an entry portion and an exit portion, each of the guide structures defining a channel;

a plurality of conveyors, wherein tubular cores are delivered to the plurality of guide structures via the plurality of conveyors, at least a portion of each of the conveyors being located adjacent to the entry point of one of the guide structures;

a plurality of interception structures, each of the interception structures being associated with the channel of one of the guide structures, each of the interception structures comprising a first interception structure configuration and a second interception structure configuration, the first interception structure configuration defining a first nip inside the channel of one of the guide structures, the second interception configuration defining a second nip inside the channel of one of the guide structures, the first nip being located at a vertically spaced location from the second nip; and a controller configured to switch each of the interception structures from one of the first interception structure configuration and the second interception structure configuration to another one of the first interception structure configuration and the second interception structure configuration to intercept the tubular cores and adjust a flow of the tubular cores through each exit portion of the guide structures.

18. A device according to claim 17, wherein each of the interception structures comprises an upper member and a lower member, the upper member being located at a vertically spaced location from the lower member.

19. A device according to claim 18, wherein each of the interception structures further comprises a connecting member, an actuator and a spring, the spring being connected to at least the lower member, the upper member and the lower member being connected to the connecting member, the upper member being connected to the actuator, the upper member moving in a direction traversing the channel of one of the guide structures and the lower member moving in a direction away from the channel of one of the guide structures upon actuation of the actuator, the upper member moving in the direction away from the channel of one of the guide structures and the lower member moving in the direction traversing the channel of one of the guide structures via the spring upon deactivation of the actuator.

20. A device according to claim 19, wherein the upper member engages one of the tubular cores and the lower member is located at a spaced location from the tubular cores in the first interception structure configuration, the lower member being in contact with the one of the tubular cores and the upper member being located at a spaced location from the tubular cores in the second interception structure configuration.

* * * * *